W. P. EVANS.
SUPPORT OR BEARING FOR DRYING CYLINDERS AND SUCH LIKE.
APPLICATION FILED SEPT. 25, 1920.
1,421,193.
Patented June 27, 1922.
2 SHEETS—SHEET 2.
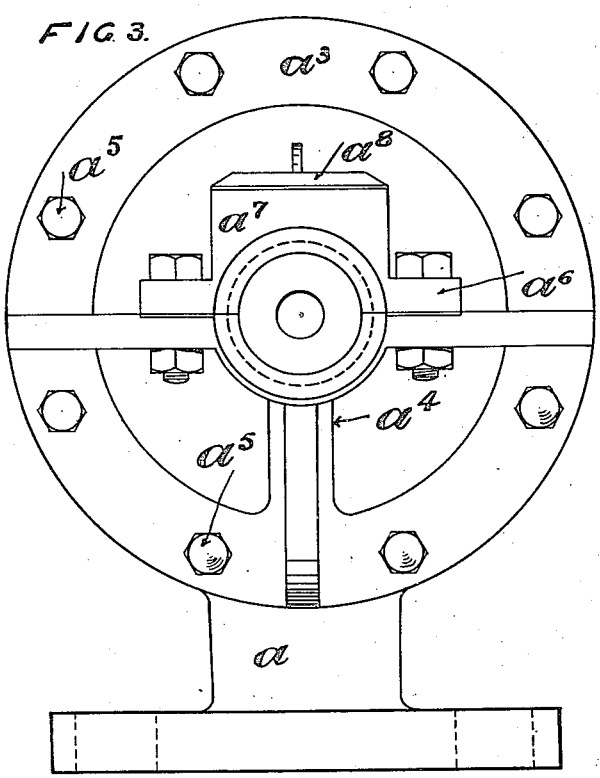
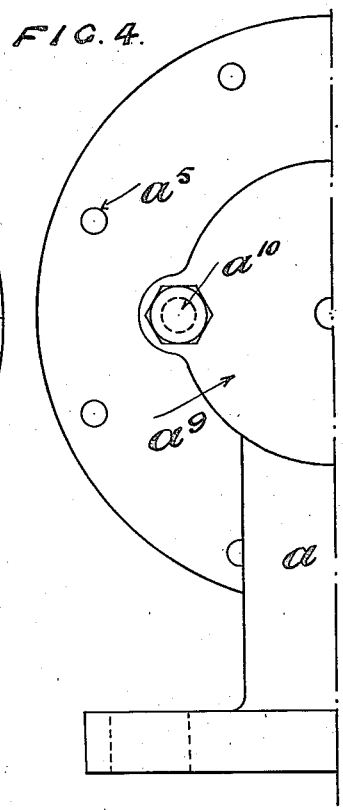
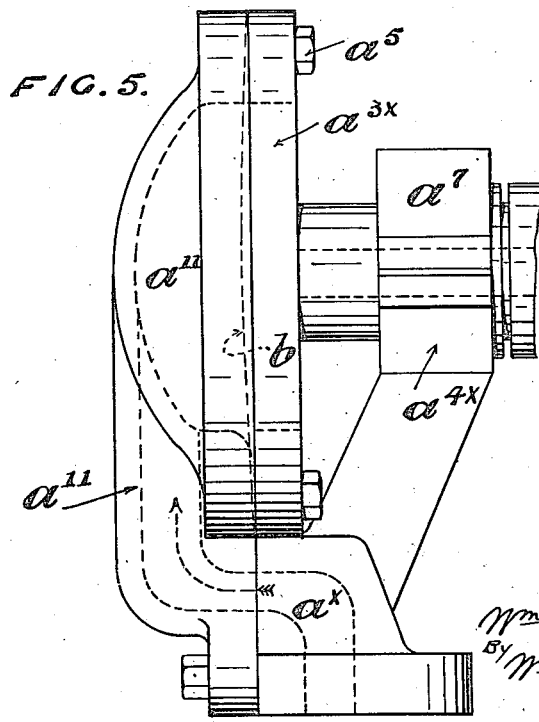

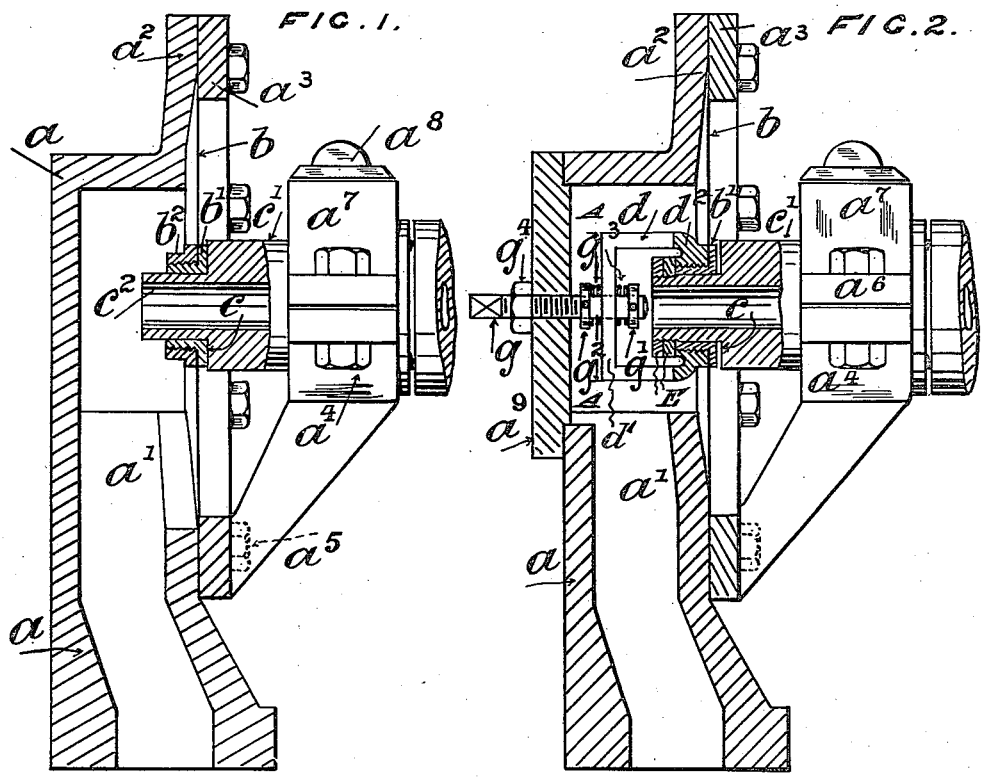

UNITED STATES PATENT OFFICE.

WILLIAM PARSONAGE EVANS, OF MANCHESTER, ENGLAND.

SUPPORT OR BEARING FOR DRYING CYLINDERS AND SUCH LIKE.

1,421,193.  Specification of Letters Patent.  Patented June 27, 1922.

Application filed September 25, 1920. Serial No. 412,845.

*To all whom it may concern:*

Be it known that I, WILLIAM PARSONAGE EVANS, a subject of the King of Great Britain and Ireland, residing at 72 Park Lane, Irlams-O'th-Height, Manchester, in the county of Lancaster, England, have invented new and useful Improvements in or Connected with Supports or Bearings for Drying Cylinders and Such like, of which the following is a specification.

This invention relates to supports or bearings for the trunnions or hollow shafts of steam heated drying cylinders, and such like, and which supports or bearings are commonly known as "doll heads."

In existing types of "doll head," a hollow bracket or standard is employed and a bearing is provided and fed with lubricant from a box, while a gland is used to force encircling packing around the exterior of the bored trunnion or neck. The packing, which is acted on by the gland, prevents escape of steam as is understood. In practice, such gland needs attention from time to time in order to keep a steam tight joint, and the gland is apt to be screwed down too tight. I find such packing is apt to grip or bind on the shaft or neck thus setting up wear and consuming power. Even without undue pressure from the gland, the packing encircling the shaft is bound to exercise an appreciable grip or binding effect.

The attached drawing illustrates, and by way of examples, forms of doll-head which embody my feature of novelty, that is the employment of a flexible diaphragm or area to effect an automatic closure due to fluid pressure.

Fig. 1 is a section showing a simple form of doll-head bearing with combined diaphragm. Fig. 1$^a$ is a detail sectional view of a modification of trunnion end.

Fig. 2 shows a modification wherein the diaphragm is backed-up by a follower with spring devices. Fig. 2$^a$ is a section taken approximately on the line A—A of Fig. 2.

Fig. 3 is an end elevation of Fig. 2 looking from the right.

Fig. 4 shows an end elevation of Fig. 2 looking from the left.

Fig. 5 is a view of a modified form of doll-head casting, adapted to receive a diaphragm in accordance with my invention, and in which removal of the end cover fully exposes the diaphragm and its co-acting parts.

In the construction illustrated by Fig. 1 I make use of a doll-head casting $a$ of appropriate design and this has a hollow chamber or cavity $a'$ and a prepared face $a^2$ for the reception of a diaphragm $b$ consisting of one or more flexible plates or sections of metal or material. This diaphragm $b$ is shown secured by a ring $a^3$ cast along with the lower bearing half $a^4$ which supports the axle or trunnion $c'$ of the drying cylinder, the ring $a^3$ being fixed in place by studs $a^5$ as shown. The upper bearing half $a^6$ may combine a lubricant box $a^7$ with cover $a^8$, as is known.

The diaphragm $b$ has a central hole or aperture and such diaphragm as to its central aperture is sweated in place and clamped between the bored rings $b'$, $b^2$, which rings may carry packings of metal or fibrous or other material. The hollow trunnion or axle $c'$ of the drying cylinder may have a turned reduction or neck $c^2$ which passes through the bored rings $b'$, $b^2$ which fit the central hole in the diaphragm, and, if desired an adjustable or other collar or annular abutment may be fitted on the turned reduction or neck $c^2$. In the illustration Fig. 1, the vertical wall of metal to the right of the turned reduction or neck $c^2$ forms the annular abutment $c$. Any other suitable construction of trunnion end may be adopted by me, as for example, a smaller diameter of tube screwed into the bored trunnion and may be provided to pass through rings such as $b'$ $b^2$, or their equivalent, as indicated by the detail view Fig. 1$^a$.

The annular abutment $c$ acts as a limit stop against which the contact ring, or packing device carried by the diaphragm is forced.

In the construction illustrated by Fig. 2, I show the diaphragm $b$ clamped between a slidable ring $b'$ and the annular part $d^2$ of a follower or slidable or movable device $d$ (separately illustrated at Fig. 2$^a$). Movement of the parts which clamp the cut out centre of the diaphragm $b$ is limited by locknuts $e$. The stirrup shaped part or cross bar $d'$ of the follower $d$ is bored and a screw $g$ or adjusting appliance is loosely connected thereto, the screw having washers $g'$, $g^2$ held by pins or otherwise, and springs $g^3$, $g^3$ are interposed between the washers and the cross-bar $d'$, which produce a non-rigid connection between the follower $d$ and the screw $g$. The screw $g$ is passed through the bored and tapped cover plate $a^8$ and has a lock-nut $g^4$ applied to it. By providing a clearance between the abutment wall $c$ and the lock-nut $e$, the screw $g$ can be set so as to act on the follower $d$ to adjust the diaphragm $b$ and its packing rings to permit a closure with a greater or smaller movement of the diaphragm. Such an arrangement also allows me to compensate for wear. The cover plate $a^9$ is removable and is secured by studs $a^{10}$.

In the construction indicated by Fig. 5, the inner ring $a^{3x}$ forms part of the casting along with the stand $a^x$ and the lower bearing half $a^{4x}$, and a large outer cover plate $a^{11}$ is removably fixed to the inner ring by studs $a^5$ the diaphragm being clamped as to its edge between the two rings. This large outer cover plate $a^{11}$ may be bored and tapped for the application of a device to control the follower or the like, if such be used with the diaphragm. The advantage of this construction is that removal of cover plate completely exposes the diaphragm etc. The cast-iron elements in this construction provide proper passage ways for steam, etc.

When a cylinder supported in such doll head bearing is at work the diaphragm is as to one face backed-up by fluid pressure, that is, low pressure steam, and consequently it provides an extended area with great accommodating capacity and by acting on the rings or supported packing effects a closure with an elastic pressure against the abutment $c$ or its equivalent.

With doll-heads such as described when steam enters and fills the hollow-cavity $a'$, the comparatively large area of the diaphragm $b$ is acted on by the steam and the rings or packing device is thrust against the end of the hollow trunnion or neck which is thus effectively packed by end thrust alone.

Not only does the use of a diaphragm or its equivalent under my invention, automatically adjust the rings or packing without calling for frequent attention by the operative, but it enables me to do away with circumferential packing altogether, and, by reason of the small lateral space required for the disposition of a diaphragm or flexible or like device and its support I can provide wider or larger bearings in the usual available space than has been heretofore possible.

The combined diaphragm or the like allows for expansion of the cylinder under steam heat and the ring or packing can readily accommodate itself to make good any failure as to perfect alignment. Also, in the event of rapid condensation of steam, the creation of a partial vacuum in the cylinder tends to cause the diaphragm device to so act as to admit air and may obviate the use of an air valve for such purpose.

I declare that what I claim is—

1. An attachable doll head bearing for steam heated drying cylinders, comprising a flexible diaphragm, a face on the doll head casting for said diaphragm, an annular clamping ring for clamping said diaphragm, bolts for securing said ring in position, said diaphragm having a central aperture therein, slidable packing rings clamping the center of the diaphragm, a hollow axle on the drying cylinder end, a shoulder on the axle forming a reduced portion on the axle, said construction allowing steam pressure to act on the outer face of the diaphragm to cause the central rings to pack said axle.

2. An attachable doll head bearing for steam heated drying cylinders, comprising a yielding area, a face thereof enclosed in the doll head, an annular clamping ring clamping the exterior portion of said yielding area to the doll head body, bolts fixing said clamping ring, said yielding area having a central aperture therein, packing rings located at said central aperture constituting a movable packing, an adjusting device capable of moving said packing rings, a screw for regulating the adjusting device, a hollow trunnion on the drying cylinder, a shoulder on the trunnion, and means for limiting movement of the packing rings, the diaphragm being actuated by steam pressure on the outer face to effect closure of the doll head.

In testimony whereof I have signed my name to this specification.

WILLIAM PARSONAGE EVANS.